United States Patent
Lin et al.

(10) Patent No.: US 9,494,888 B2
(45) Date of Patent: Nov. 15, 2016

(54) IMAGING DEVICE COMPONENTS COMPRISED OF HYDROPHOBIC CARBON NANOTUBES

(71) Applicant: XEROX CORPORATION, Norwalk, CT (US)

(72) Inventors: Liang-Bih Lin, Rochester, NY (US); David H Pan, Rochester, NY (US); Daniel Levy, Philadelphia, PA (US); Jin Wu, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/480,550

(22) Filed: Sep. 8, 2014

(65) Prior Publication Data

US 2014/0376964 A1 Dec. 25, 2014

Related U.S. Application Data

(62) Division of application No. 11/939,776, filed on Nov. 14, 2007, now Pat. No. 8,840,998.

(51) Int. Cl.
| | |
|---|---|
| *G03G 15/02* | (2006.01) |
| *G03G 21/00* | (2006.01) |
| *G03G 15/20* | (2006.01) |
| *B82Y 30/00* | (2011.01) |
| *B82Y 40/00* | (2011.01) |

(52) U.S. Cl.
CPC ...... *G03G 15/0233* (2013.01); *G03G 15/0291* (2013.01); *G03G 15/2057* (2013.01); *G03G 21/0017* (2013.01); *G03G 21/0035* (2013.01); *G03G 21/0058* (2013.01); *B82Y 30/00* (2013.01); *B82Y 40/00* (2013.01); *G03G 2215/021* (2013.01); *G03G 2215/027* (2013.01); *G03G 2215/028* (2013.01); *Y10T 428/31504* (2015.04)

(58) Field of Classification Search
None
See application file for complete search history.

(56) References Cited

U.S. PATENT DOCUMENTS

| | | | | |
|---|---|---|---|---|
| 7,531,277 | B1 * | 5/2009 | Facci | G03G 5/10 399/343 |
| 2004/0020789 | A1 | 2/2004 | Hu et al. | |
| 2004/0206942 | A1 | 10/2004 | Hsu | |
| 2005/0208304 | A1 | 9/2005 | Collier et al. | |
| 2006/0292360 | A1 | 12/2006 | Hays et al. | |
| 2008/0306202 | A1 * | 12/2008 | Lin et al. | 524/432 |

OTHER PUBLICATIONS

Lau et al. Superhydrophobic Carbon Nanotube Forests, 2003, 1701-1705, Nano Letters, vol. 3, No. 12.

(Continued)

*Primary Examiner* — Cheng Huang
(74) *Attorney, Agent, or Firm* — MH2 Technology Law Group LLP

(57) ABSTRACT

An electrophotographic imaging device includes a charging device, a cleaning device, and a fuser member that each include hydrophobic carbon nanotubes. The use of hydrophobic carbon nanotubes can increases the charging device's, the cleaning device's, and the fuser member's durability, conductivity, and contaminants deposition.

6 Claims, 3 Drawing Sheets

(56) References Cited

OTHER PUBLICATIONS

Rugar and Hansma, Atomic Force Microscopy, 1990, 23-30, Physics Today, vol. 43, Issue 10.
Ginic-Markovic et al. Synthesis of New Polyanilline/Nanotube Composite Using Ultrasonic Initiated Emulsion Polymerization, 2006, 6258-6265, Chemistry of Materials, vol. 18, No. 26.
Hong et al. Surface transfomration of carbon nanotube powder into super-hydrophobic and measurement of wettability, Chemical Physics Letters, 2006, vol. 427, pp. 390-393.
Wang et al. Noncovalent Functionalization of Multiwalled Carbon Nanotubes: Application in Hybrid Nanostructures, Journal of Physical Chemistry, 2006, vol. 110, pp. 6631-6636.
Zhou et al, Isothermal Crystallization Kinetics of Polypropylene with Silane Functionalized Multi-Walled Carbon Nanotubes, Journal of Polymer Science, May 22, 2007, vol. 45:13, pp. 1616-1624.
Lin et al. Functionalizing multi-walled carbon nanotubes with poly(oxyalkylene)-amidoamines, Nanotechnology, Jun. 7, 2006, vol. 17, pp. 3197-3203.
Cho et al. (2007) "Hydrophobic Coating of Carbon Nanotubes by CH4 Glow Plasma at Low Pressure, and Their Resulting Wettability," Journal of Materials Chemistry, vol. 17, pp. 232-237 (epublished Nov. 17, 2006).

* cited by examiner

IMAGING DEVICE COMPONENTS COMPRISED OF HYDROPHOBIC CARBON NANOTUBES

RELATED APPLICATION

This application is a divisional of U.S. patent application Ser. No. 11/939,776 filed Nov. 14, 2007, now U.S. Pat. No. 8,840,998, the entire disclosure of which is incorporated herein by reference in its entirety.

FIELD

The subject matter of the teachings disclosed herein relates to electrophotographic imaging. More particularly, the subject matter of the teachings disclosed herein relates to improved components/devices/subsystems for electrophotographic imaging.

BACKGROUND

Systems for electrophotographic imaging include, for example, charging devices, fusing devices, and cleaning devices. Charging devices are needed, for example, to charge a photoreceptor ("receptor"), recharge a toner layer, charge an intermediate transfer belt for electrostatic transfer of toner, or charge a sheet of media, such as a sheet of paper. Conventional non-contact charging devices typically apply high DC voltages to wires or pins, such as corotrons, scorotrons and dicorotrons, to produce ions for charging. Problems arise because the undesired highly reactive oxidizing species that are also generated in the process degrade the photoreceptor and causes air pollution. Alternative contact charging devices use high AC voltages to charge bias charging rolls. Problems arise with contact charging devices because the reactants generated along with mechanical wear serve to also degrade the photoreceptor.

Cleaning devices can include various mechanisms to physically remove toner particles from various surfaces. Cleaning devices, for example, brushes, blades and rolls, are almost constantly in contact with surfaces of imaging members, intermediate transfer members, bias charge rollers, and other subsystem components. The abrasive nature of such contact induces mechanical wear and tear on their surfaces that eventually causing print defects. As a result, cleaning devices in electrophotographic systems suffer from short operating life.

Fusing devices consisting of a fusing member, e.g. a heating roll member, a pressure roll member, a release agent donor roll, or any member in the fusing device, permanently affix a transferred image to a support material, typically paper, to create a copy or print for subsequent removal of the finished copy. High speed fusing devices for black/white (B/W) imaging and color imaging, both suffer from similar failure modes including, for example, fusing offset and surface degradation associated print defects, delamination between a fuser member and metal substrate or silicone under-layer, uneven wear, and high wear. Release oil and/or release layer (resilient covering) coating are usually applied to a fuser member to minimize the effects of some of these problems. However, chemical reaction and thermal heating induced surface degradation derived from interaction of the oil, toner particles, and coating causes an uneven surface and defective patterns in print images. Amino-functional release oil can chemically react to a Viton coating and also to toner ingredients, thereby initiating and leading to image offset failure. For color fusing, fuser life is limited by the image offset problem and further related to the physical interaction between a toner and a degraded toner surface. Thus, chemical and physical surface interaction is once of the major culprits in limiting the life of fusing subsystem components.

Mechanical and associated system failures related to fusing components, cleaning components, and charging components leads to higher total cost of ownership (TCO) and costs to a manufacturer. Studies have revealed that the two major concerns for customers are machine reliability and TCO. Increasing operating life for electrophotographic devices can greatly increase customer satisfaction with a particular manufacturer's imaging devices.

Accordingly, the present teachings solve these and other problems of the prior art's performance failures associated with fusing components, cleaning components, and charging components.

SUMMARY

In accordance with the present teachings, a fusing member for an electrophotographic imaging apparatus is provided. The fusing member can include a substrate and a polymer layer disposed over the substrate. It can further include a plurality of hydrophobic carbon nanotubes disposed throughout the polymer layer.

In accordance with the present teachings, a cleaning device disposed in an electrophotographic imaging apparatus is provided. The cleaning device can include a component configured to contact a surface for cleaning, and a plurality of hydrophobic carbon nanotubes integrated with the component.

In accordance with the present teachings, a charging device for an electrophotographic imaging apparatus is provided. The charging device can include a charging member having a surface and a shape, the shape selected from the group consisting of a wire, a pin, and a roll. It can further include a coating disposed on the surface of the charging member, wherein the coating comprises a plurality of hydrophobic nanotubes.

In accordance with the present teachings, a Dias charging member for an electrophotographic imaging apparatus is provided. The bias charging member can include a support substrate and a plurality of conductive coatings over the support substrate, wherein at least one of the conductive coatings comprises a plurality of hydrophobic carbon nanotubes in a resin or a polymer binder.

Additional advantages of the embodiments will be set forth in part in the description which follows, and in part will be obvious from the description, or may be learned by practice of the teachings. The advantages will be realized and attained by means of the elements and combinations particularly pointed out in the appended claims.

It is to be understood that both the foregoing general description and the following detailed description are exemplary and explanatory only and are not restrictive of the teachings, as claimed.

The accompanying drawings, which are incorporated in and constitute a part of this specification, illustrate embodiments of the teachings and together with the description, serve to explain the principles of the teachings.

DESCRIPTION OF THE EMBODIMENTS

Reference will now be made in detail to the present embodiment examples of which are illustrated in the accompanying drawings. Wherever possible, the same reference numbers will be used throughout the drawings to refer to the same or like parts.

Figure 1:
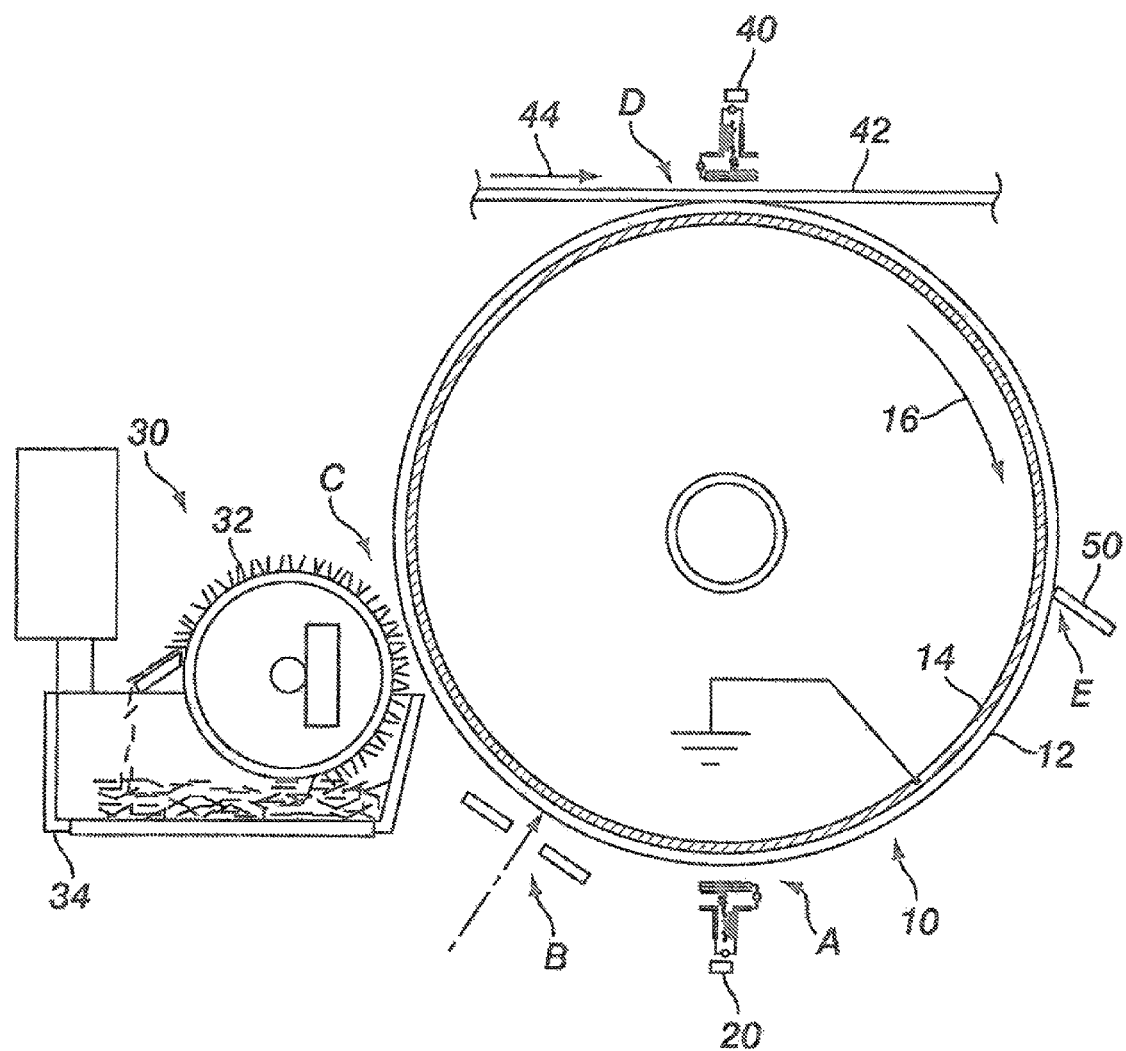
FIG. 1 shows an electrophotographic reproducing apparatus, in accordance with the principles of the present teachings.

Referring initially to FIG. 1, prior to describing the specific features of the exemplary embodiments, a schematic depiction of the various components of an exemplary electrophotographic reproduction apparatus incorporating fusing, charging, and cleaning devices, various embodiments of which are described in more detail below, is provided.

The exemplary electrophotographic reproducing apparatus of FIG. 1 can include a drum including a photoconductive surface 12 deposited on an electrically grounded conductive substrate 14. A motor (not shown) engages with drum 10 for rotating the drum 10 in the direction of arrow 16 to advance successive portions of photoconductive surface face 12 through various processing stations disposed about the path of movement thereof, as will be described. Initially, a portion of drum 10 passes through charging station A. At charging station A, a charging device, indicated generally by reference numeral 20, charges the photoconductive surface 12 on drum 10 to a relatively high potential.

Once charged, the photoconductive surface 12 can be advanced to imaging station B where an original document (not shown) can be exposed to a light source (also not shown) for forming a light image of the original document onto the charged portion of photoconductive surface 12 to selectively dissipate the charge thereon, thereby recording onto drum 10 an electrostatic latent image corresponding to the original document.

One skilled in the art will appreciate that various method can be used to irradiate the charged portion of the photoconductive surface 12 for recording the latent image thereon. For example, a properly modulated scanning beam of electromagnetic radiation (e.g., a laser beam) can be used to irradiate the portion of the photoconductive surface 12.

After the electrostatic latent image is recorded on photoconductive surface 12, the drum is advanced to development station C where a development system, such as a so-called magnetic brush developer, indicated generally by the reference numeral 30, deposits developing material onto the electrostatic latent image.

The exemplary development system 30 shown in FIG. 1 includes a single development roller 32 disposed in a housing 34, in which toner particles are typically triboelectrically charged by mixing with larger, conductive carrier beads in a sump to form a developer that is loaded onto developer roller 32 that can have internal magnets to provide developer loading, transport, and development. The developer roll 32 having a layer of developer with the triboelectric charged toner particles attached thereto can rotate to the development zone whereupon the magnetic brush develops a toner image on the photoconductive surface 12. It will be understood by those skilled in the art that numerous types of development systems can be used.

Referring again to FIG. 1, after the toner particles have been deposited onto the electrostatic latent image for development, drum 10 advances the developed image to transfer station D, where a sheet of support material 42 is moved into contact with the developed toner image in a timed sequence so that the developed image on the photoconductive surface 12 contacts the advancing sheet of support material 42 at transfer station D. A charging device 40 can be provided for creating an electrostatic charge on the backside of support material 42 to aid in inducing the transfer of toner from the developed image on photoconductive surface 12 to the support material 42.

After image transfer to support material 42, support material 42 is subsequently transported in the direction of arrow 44 for placement onto a conveyor (not shown) which advances the support material 42 to a fusing station (not shown) gnat permanently affixes the transferred image to the support material 42 thereby for a copy or print for subsequent removal of the finished copy by an operator.

According to various embodiments, after the support material 42 is separated from the photoconductive surface 12 of drum 10, some residual developing material can remain adhered to the photoconductive surface 12. Thus, a final processing station, such a cleaning station E, can be provided for removing residual toner particles from photoconductive surface 12 subsequent to separation of the support material 42 from drum 10.

Cleaning station E can include various mechanisms, such as a simple blade 50, as shown, or a rotatably mounted fibrous brush (not shown) for physical engagement with photoconductive surface 12 to remove toner particles therefrom, Cleaning station E can also include a discharge lamp (not shown) for flooding the photoconductive surface 12 with light in order to dissipate any residual electrostatic charge remaining thereon in preparation for a subsequent image cycle.

According to various embodiments, an electrostatographic reproducing apparatus may take the form of several well known devices or systems. Variations of the specific electrostatographic processing subsystems or processes described herein can be applied without affecting the operation of the present invention.

Once of the major enablers in reducing TCO is to improve operating lives of subsystem components. In accordance with the teachings disclosed herein a novel charging device, a novel cleaning device, and a novel fuser member for an electrophotographic imaging system are disclosed. A novel charging device, a novel cleaning device, and a novel fuser member are disclosed that include hydrophobic carbon nanotubes (CNT).

Hydrophobic carbon nanotubes have the advantages of both high electrical conductivity and thermal conductivity, and low humidity sensitivity, owing to their molecular and electrical structures and hydrophobic nature. The high electrical conductivity of carbon nanotubes has been reported to be as high as $2 \times 10^{-6}$ ohm-cm, comparable to that of metals like copper. Thermal conductivity of single walled CNT has been demonstrated to be as high as approximately 500 W/mK at room temperature. For isolated carbon nanotubes, thermal conductivity can be as high as approximately 6600 W/K, which is similar to that of diamond.

Hydrophobicity of the carbon nanotubes can be achieved generally by grafting hydrophobic moieties onto the surface of the carbon nanotubes. High solubility can be obtained in typical organic solvents such as toluene or Tetrahydrofuran (THF), as discussed in the article "Functionalized Carbon Nanotubes by poly(oxyalkylene)-amidoamines", Nanotechnology 17, 3197, 2006 the entirety of which is incorporated by reference herein. Other methods include embedding or encapsulating of hydrophobic materials, such as examples given in "Noncovalent functionalization or multiwalled carbon nanotubes: application in hybrid structures, J Phys. Chem.B, 110, 6631, 2006 the entirety of which is incorporated by reference herein. Surface treatments by plasma or electron beams can be employed, such as those disclosed in "Hydrophobic coating of carbon nanotubes by $CH_4$ glow plasma at pressure, and the resulting wettability", J Materials Chemistry 17, 233, 2006 the entirety of which is incorporated by reference herein. Water contact angle of hydrophobic CNT can be as high as 166°, exceeding those with chemically modified surfaces. In various other embodiments, partially modified CNT can be used. As used herein, a partially modified CNT refers to a CNT that has a hydrophobic portion along its length. Partially modified CNT can be formed by similar methods for forming hydrophobic CNT such that only a portion of the nanotube becomes hydrophobic. With high electrical and thermal conductivity and super hydrophobicity, hydrophobic CNT and partially modified CNT are particularly suitable for electrophotographic applications.

Figure 2:
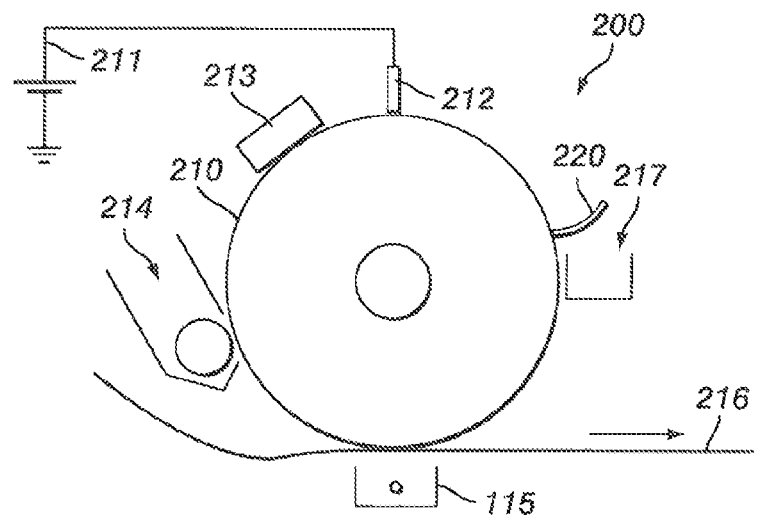
FIG. 2 shows a high speed color fusing subsystem, in accordance with the principles of the present teachings.

FIG. 2 shows an electrophotographic reproducing apparatus 200, in accordance with the principles of the present teachings, it should be readily apparent to those of ordinary skill in the art that the electrophotographic reproducing apparatus 200 shown in FIG. 2 represents a generalized system illustration and that other components can be added or existing components can be removed or modified while still remaining within the spirit and scope of the present teachings.

FIG. 2 shows an electrophotographic reproducing apparatus wherein a light image of an original to be copied is recorded in the form of an electrostatic latent image upon a photosensitive member. The latent image is subsequently rendered visible by the application of electroscopic thermoplastic resin particles which are commonly referred to as toner. Specifically, photoreceptor 210 is charged on its surface by means of a charging device 212 to which a voltage has been supplied from power supply 211. The photoreceptor is then imagewise exposed to light from an optical system or an image input apparatus 213, such as a laser and light emitting diode, to form an electrostatic latent image thereon. Generally, the electrostatic latent image is developed by bringing a developer mixture from developer station 214 into contact therewith.

According to various embodiments, the charging device 212 can have a shape, e.g., a wire, a pin, a roll, a tube, or any other shaped that can be used for a charging device, such as, for example, a corotron, a scorotron, or a dicorotron. In accordance with the principles disclosed herein, charging device 212 can include a coating on the surface the charging device. The coating can include a plurality of hydrophobic carbon nanotubes (CNT). As used herein, the term hydrophobic CNTs includes super hydrophobic CNT, where superhydrophobic is defined as for materials having surfaces that are extremely difficult to wet with water contact angles in excess of 120°.

In various other embodiments, charging device 212 can be a bias charging roll in which the high conductivity of CNT can allow for a low percolation threshold, i.e., doping concentration and less perturbing to the mechanical properties of the base material. For bias charging rolls, hydrophobic CNT can be used as conductive fillers. For a bias charging roll, only a small percentage, e.g., <1%, of super hydrophobic CNT can be sufficient to achieve a desired conductivity for charging application, although a greater percentage is within the spirit and scope of the teachings. For wire and pin devices, functional moieties grafted nanotubes, powder or solvent-based coating can be used.

The super hydrophobic nature of CNT can improve the operating life of any type of charging device due to reduced friction and contaminants deposition.

Thus, in accordance with the principles disclosed herein hydrophobic CNT, e.g., super hydrophobic CNT, can be included with the novel charger 112 to improve its operating life and to improve print quality. In various embodiments, the exemplary charging devices can further include carbon nanotubes in addition to the hydrophobic CNT. The carbon nanotubes can include single walled CNT and/or multi-walled CNT.

Development can be affected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

Referring again to FIG. 2, after toner particles have been deposited on the photoconductive surface, in image configuration, they are transferred to a copy sheet 216 by transfer means 215, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

Photoreceptor 210, subsequent to transfer, advances to cleaning station 217, wherein any toner left on photoreceptor 210 is cleaned therefrom by use of a cleaning device 220 that includes hydrophobic CNT thereon. Cleaning device 220 can be in the form of a roll, a blade, and a brush. Alternately, or in combination with the cleaning device 220, the electrostatographic reproducing apparatus 200 can include more than one brush, blade or roll that includes hydrophobic CNT. The hydrophobic CNT can be integrated with the novel cleaning components by any method that layers or integrates the hydrophobic CNT to the novel cleaning components disclosed herein. Examples of preparation methods include powder coating, solvent-based coating of hydrophobic CNT onto surfaces of cleaning devices or blending the CNT into cleaning devices by extrusion, molding, or casting. In various embodiments, cleaning device 220 can be formed of a high wear resistant elastomer, such as, for example, polyurethane. According to various embodiments, the amount of CNT can be about 0.5 wt % to about 20 wt % of the coating. In various embodiments, the exemplary cleaning devices can further include carbon nanotubes in addition to the hydrophobic CNT. The carbon nanotubes can include single walled CNT and/or CNT.

Figure 3:
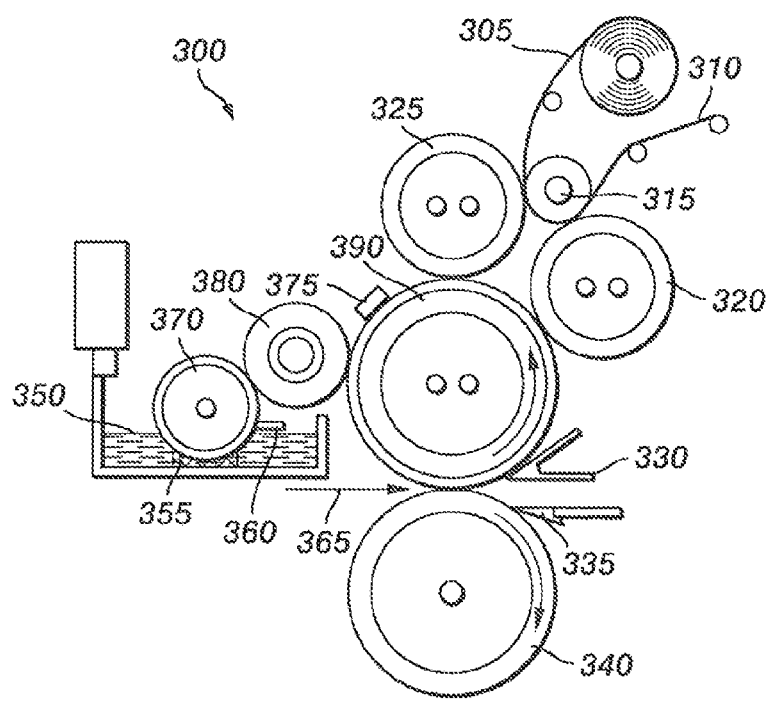
FIG. 3 shows a high speed B/W fusing subsystem, in accordance with the principles of the present teachings.

FIG. 3 shows a high speed color fusing subsystem 300, in accordance with the principles of the present teachings. It should be readily apparent to those of ordinary skill in the art that the system 300 shown in FIG. 3 represents a generalized system illustration and that other components can be added or existing components can be removed or modified while still remaining within the spirit and scope of the present teachings.

In particular, the high speed color fusing subsystem 300 can include a first cleaning web 305, a second cleaning web 310, a backer roll 315, a first external heat roll 320, an air knife 330, a stripper finger 335, and a pressure roll 340. The high speed color fusing subsystem 300 can further include a release fluid 350, a wick 355, a metering blade 360, a media path 365, a metering roll 370, a thermistor 375, a donor roll 380, a second external heat roll 385, and a fuser roll 390.

The first cleaning web 305, the second cleaning web 310, the backer roll 315, the air knife 330, the stripper finger 335, the pressure roll 340, the release fluid 350, the wick 355, the metering blade 360, the media path 365, the metering roll 370, the thermistor 375, and the donor roll 380 can be conventional components of the high speed color fusing subsystem 300. Media 365 advances through the high speed color fusing subsystem 300 wherein a developed image is fused to media 365 by passing media 365 between the fuser roll 390 and pressure roll 340, thereby forming a permanent image.

In accordance with the present teachings, the high speed color fusing subsystem 300 can include a first external heat roll 320, a second external heat roll 385, and a fuser roll 390. In accordance with the teachings disclosed herein, in particular, the first external heat roll 320, the second external heat roll 385, and the fuser roll 390 can include hydrophobic CNT. Moreover, the first external heat roll 320, the second external heat roll 385, and the fuser roll 390 can include fluorinated CNT. The first external heat roll 320, the second external heat roll 385, and the fuser roll 390 can be formed of, for example, a substrate and one or more polymer layers disposed over the substrate. In various embodiments, the one or more polymer layers can be formed of, for example, a fluoroelastomer (e.g., Viton®), silicone, a fluoropolymer (e.g., Teflon®) or other elastomeric polymers. The hydrophobic CNT can be dispersed throughout the one or more polymer layers in an amount of about 0.5 wt % to about 20 wt % weight percent.

In various other embodiments, the first external heat roll 320, the second external heat roll 385, and the fuser roll 390 can be formed of, for example, a composite material including a polymer matrix, a plurality of hydrophobic CNT, and a plurality of CNT, either single or multi-walled CNT. Each of the plurality of CNT can be formed of a carbon nanotube and a hydrophobic component. The hydrophobic component can be attached to the CNT by grafting, encapsulating, or surface treatment as disclosed herein. In various other embodiments, the hydrophobic CNT can be partially modified CNT.

Figure 4:
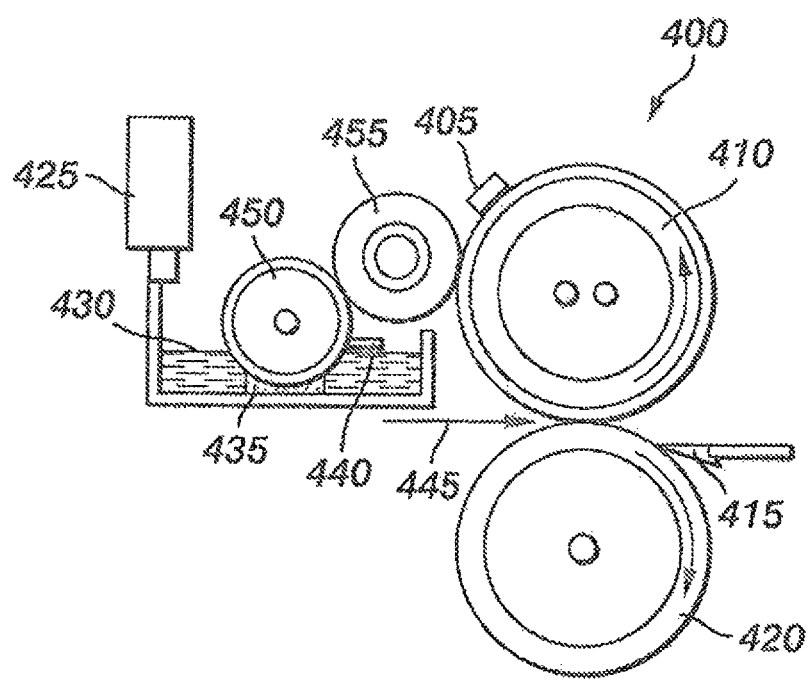
FIG. 4 shows a detailed view of a fuser roll for a high speed color fusing subsystem and a fuser roll for a high speed BAN fusing subsystem, in accordance with the principles of the present teachings.

FIG. 4 shows a high speed BA/V fusing subsystem 400, in accordance with the principles of the present teachings. It should be readily apparent to those of ordinary skill in the art that the system 400 shown in FIG. 4 represents a generalized system illustration and that other components can be added or existing components can be removed or modified while still remaining within the spirit and scope of the present teachings.

In particular, the high speed B/W fusing subsystem 400 can include a thermistor 405, a stripper finger 415, a pressure roll 420, a sump 425, and release fluid 430. The high speed BAN fusing subsystem 400 can further include a wick 435, a metering blade 440, a media path 445, a metering roll 450, and a donor roll 455.

The thermistor 405, the stripper finger 415, the pressure roll 420, the sump 425, release fluid 430, the wick 435, the metering blade 440, the media path 445, the metering roll 450, and the donor roll 455 can be conventional components of the high speed B/W fusing subsystem 400. Media 445 advances through the high speed B/W fusing subsystem 400 wherein a developed image is fused to media 445 by passing media 445 between the fuser roll 410 and pressure roll 420, thereby forming a permanent image.

In accordance with the present teachings, the high speed B/W fusing subsystem 400 can include a fuser roll 410. In accordance with the teachings disclosed herein, the fuser roll 410 can include hydrophobic CNT, e.g., fluorinated CNT. Fuser roll 410 can be formed of, for example, a substrate and one or more polymer layers disposed over the substrate. The hydrophobic CNT can be dispersed throughout the one or more polymer layers. In various embodiments, the high speed B/W fusing subsystem 400 can further include carbon nanotubes in addition to the hydrophobic CNT The carbon nanotubes can include single walled CNT and/or multi-walled CNT.

Figure 5:
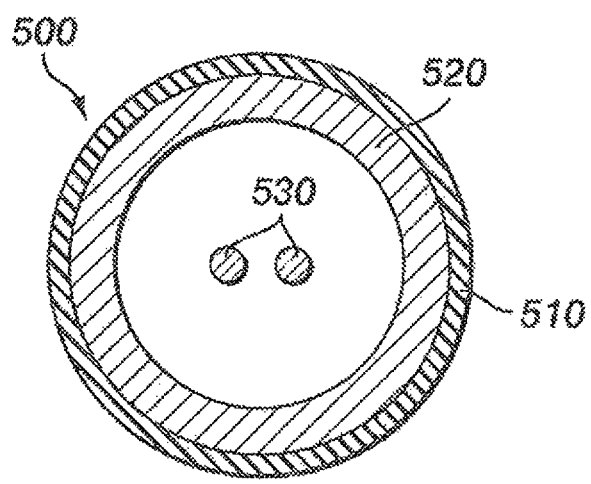
FIG. 5 shows a detailed view of an external heat roll for a high speed color fusing subsystem, in accordance with the principles of the present teachings.

FIG. 5 shows a cross-sectional view of a fuser roll 500, in accordance with the principles of the present teachings,. It should be readily apparent to those of ordinary skill in the art that the fuser roll 500 shown in FIG. 5 represents a generalized system illustration and that other components can be added or existing components can be removed or modified while still remaining within the spirit and scope of the present teachings.

Fuser roll 500 can include heating elements 530, a core layer 520, e.g., a metal substrate or silicone under-layer, and a hydrophobic CNT outer layer 510, e.g., fluorinated CNT. As discussed above, the hydrophobic CNT outer layer 510 provides the fuser roll 500 with the unique properties of both high electrical conductivity and thermal conductivity, and low humidity sensitivity, while simultaneously providing improved wear resistance. According to various embodiments, each of the hydrophobic carbon nanotubes can be a carbon nanotube encapsulated by a layer of a fluorinated compound, such as fluorinated hydrocarbons and fluorinated alkylsilanes, a silicone, such as polydimethylsiloxane, an alkylsilanes, such as isobutyltrimethoxysilane, or an amine, such poly(oxyalkylene)-amidoamines.

While the teachings disclosed herein has been illustrated with respect to one or more implementations alterations and/or modifications can be made to the illustrated examples without departing from the spirit and scope of the appended claims. In addition, while a particular feature of the teachings disclosed herein may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the e "comprising."

Other embodiments of the teachings disclosed herein will be apparent to those skilled in the art from consideration of the specification and practice of the teachings disclosed herein. It is intended that the specification and examples be considered as exemplary only, with a true scope and spirit of the teachings disclosed herein being indicated by the following claims.

What is claimed is:

1. An electrophotographic imaging apparatus comprising:
a power supply;

a photoreceptor; and a bias charging member comprising:

a support substrate;

a plurality of conductive coatings over the support substrate, wherein at least one of the plurality of conductive coatings comprises a plurality of hydrophobic carbon nanotubes in a resin or a polymer binder, and greater than 0% to less than 1% super hydrophobic carbon nanotubes, wherein the super hydrophobic carbon nanotubes have a water contact angle of greater than 120°, and wherein the bias charging member receives voltage from the power supply and charges a surface of the photoreceptor.

2. The electrophotographic imaging apparatus of claim 1, wherein the plurality of hydrophobic nanotubes comprises partially modified carbon nanotubes.

3. The electrophotographic imaging apparatus of claim 1, wherein the at least one of the plurality of conductive coatings further comprises single walled carbon nanotubes and multi-walled carbon nanotubes.

4. The electrophotographic imaging apparatus of claim 1, wherein the plurality of hydrophobic carbon nanotubes comprises grafted hydrophobic moieties.

5. The electrographic imaging apparatus of claim 1, wherein the plurality of hydrophobic carbon nanotubes comprises encapsulated hydrophobic material.

6. The electrographic imaging apparatus of claim 1, wherein the plurality of hydrophobic carbon nanotubes comprises partially modified carbon nanotubes each of which have a hydrophobic portion along a length thereof.

\* \* \* \* \*